United States Patent
Chao et al.

(10) Patent No.: US 10,560,812 B2
(45) Date of Patent: Feb. 11, 2020

(54) METHOD AND APPARATUS FOR PERFORMING MBMS COMMUNICATIONS AND METHOD AND APPARATUS FOR RECEIVING MBMSS

(75) Inventors: Hua Chao, Shanghai (CN); Zhongji Hu, Shanghai (CN); He Wang, Shanghai (CN); Philippe Godin, Viroflay (FR)

(73) Assignee: Alcatel Lucent, Nozay (FR)

( * ) Notice: Subject to any disclaimer, the term of this patent is extended or adjusted under 35 U.S.C. 154(b) by 451 days.

(21) Appl. No.: 14/009,859

(22) PCT Filed: Mar. 28, 2012

(86) PCT No.: PCT/IB2012/000881
§ 371 (c)(1),
(2), (4) Date: Oct. 4, 2013

(87) PCT Pub. No.: WO2012/137075
PCT Pub. Date: Oct. 11, 2012

(65) Prior Publication Data
US 2014/0022976 A1    Jan. 23, 2014

(30) Foreign Application Priority Data
Apr. 4, 2011    (CN) .......................... 2011 1 0085858

(51) Int. Cl.
*H04W 4/06*    (2009.01)
*H04W 4/21*    (2018.01)

(52) U.S. Cl.
CPC ............. *H04W 4/06* (2013.01); *H04W 4/21* (2018.02)

(58) Field of Classification Search
CPC .................. H04W 4/06; H04W 4/021
(Continued)

(56) References Cited

U.S. PATENT DOCUMENTS 8,396,020 B2 *   3/2013  Lee et al. ................... 370/312
2005/0216812 A1*  9/2005  Leon .................. H04L 1/1887
                                                         714/748
(Continued)

FOREIGN PATENT DOCUMENTS

CN    1627854 A    6/2005
CN    101771482 A    7/2010
(Continued)

OTHER PUBLICATIONS

Alcatel-Lucent Shanghai Bell, Alcatel-Lucent, "Select and receive MBMS with location information," Apr. 11-15, 2011, R2-112226 3GPP TSG RAN WG2 Meeting #73bis Shanghai, China.*
(Continued)

*Primary Examiner* — Maharishi V Khirodhar
*Assistant Examiner* — Kenneth P Hunt
(74) *Attorney, Agent, or Firm* — Fay Sharpe LLP

(57) ABSTRACT

Embodiments of the present invention provide a method and apparatus for performing MBMS service communications and a method and apparatus for receiving an MBMS service. Specifically, there is provided a method for performing MBMS service communications, comprising acquiring location area information of an MBMS service distribution; and notifying a UE of the location area information of the MBMS service distribution. Further, there is provided a method for receiving an MBMS service, comprising receiving location area information of an MBMS service distribution; comparing location information of a UE with the location area information of the MBMS service distribution; and determining whether to read an MCCH and MCCH information change notification based on a comparison result.

22 Claims, 6 Drawing Sheets

(58) Field of Classification Search
USPC .................................................... 370/312
See application file for complete search history.

(56) References Cited

U.S. PATENT DOCUMENTS

| | | | | |
|---|---|---|---|---|
| 2006/0040655 | A1* | 2/2006 | Kim | H04W 76/002 455/426.1 |
| 2007/0124395 | A1* | 5/2007 | Edge | H04H 20/59 709/206 |
| 2009/0180417 | A1* | 7/2009 | Frost | H04W 72/005 370/312 |
| 2010/0238903 | A1* | 9/2010 | Kitazoe | H04W 36/0038 370/332 |
| 2010/0254360 | A1 | 10/2010 | Ueda et al. | |
| 2010/0315987 | A1* | 12/2010 | Kuo | H04W 72/005 370/312 |
| 2011/0305183 | A1* | 12/2011 | Hsu | H04W 72/005 370/312 |
| 2012/0093060 | A1* | 4/2012 | Huschke et al. | 370/312 |
| 2012/0281610 | A1 | 11/2012 | Ai et al. | |

FOREIGN PATENT DOCUMENTS

| | | |
|---|---|---|
| CN | 101836467 A | 9/2010 |
| CN | 101888592 A | 11/2010 |
| CN | 101990163 A | 3/2011 |
| EP | 2211568 A2 | 7/2010 |
| WO | 2011157216 A1 | 12/2011 |

OTHER PUBLICATIONS

Chia-Chun Hsu, Yih-Shen Chen, U.S. Appl. No. 61/57706, filed Jun. 23 2010.*
ETSI TS 123 003 V9.5.0, Jan. 2011, http://www.etsi.org/deliver/etsi_ts/123000_ 123099/123003/09.05.00_60/ts_123003v090500p.pdf.*
ETSI TS 125 346 V10.0.0, Mar. 2011, http://www.etsi.org/deliver/etsi_ts/125300_ 125399/125346/10.00.00_60/ts_125346v100000p.pdf.*
ETSI TS 126 346 V9.4.0, Oct. 2011, https://archive.org/details/etsi_ts_126_346_v09.04.00.*
International Search Report for PCT/IB2012/000881 dated Sep. 27, 2012.
English Bibliography for Chinese Patent Publication No. CN1627854A, published Jun. 15, 2005, printed from Thomson Innovation on Jan. 15, 2015, 3 pages.
European Patent Application No. 12768222, Extended European Search Report, dated Aug. 25, 2014, 8 pp.
R2-110800, 3GPP TSG-RAN WG2 Meeting #73, Stage 3 CR for MCMS enhancement, Feb. 21-25, 2011, Taipei, China, 14 pp.
R2-112226, 3GPP TSG-RAN WG2 Meeting #73bis, Select and receive MBMS with location information, Apr. 11-15, 2011, Shanghai, China, 3 pp.
PCT Patent Application No. PCT/IB2012/000881, Written Opinion of the International Searching Authority, dated Sep. 27, 2012, 5 pp.
English Bibliography for Chinese Patent Application Publication No. CN101771482A, published Jul. 7, 2010, printed from Thomson Innovation on Sep. 12, 2014, 3 pp.
English Bibliography for Chinese Patent Application Publication No. CN101836467A, published Sep. 15, 2010, printed from Thomson Innovation on Sep. 12, 2014, 4 pp.
English Bibliography for Chinese Patent Application Publication No. CN101888592A, published Nov. 17, 2010, printed from Thomson Innovation on Sep. 12, 2014, 3 pp.
English Bibliography for Chinese Patent Application Publication No. CN101990163A, published Mar. 23, 2011, printed from Thomson Innovation on Sep. 12, 2014, 3 pp.
R2-112228, Change Request to 36.331 Selecting and receiving MBMS with location information, 3GPP TSG-RAN WG2 Meeting #73bis, Apr. 4-15, 2011, Shanghai, China, 3 pp.
R2-111842, Clarification on MBMS Location Information, 3GPP TSG RAN WG2 Meeting #73bis, Apr. 4-15, 2011, Shanghai, China, 3 pp.

* cited by examiner

METHOD AND APPARATUS FOR PERFORMING MBMS COMMUNICATIONS AND METHOD AND APPARATUS FOR RECEIVING MBMSS

FIELD OF THE INVENTION

The present invention relates to the field of Multimedia Broadcast Multicast Services (MBMSs), and more particularly, relates to a method and apparatus for performing MBMS service communications and a method and apparatus for receiving MBMS services.

BACKGROUND OF THE INVENTION

Currently, in the MBMS field, an MBMS notification procedure is used, by a base station at a network side (which refers to an NB before Release 8 or to an eNB in Release 8 and thereafter), to notify a User Equipment (UE) of an incoming MBMS service or change of an MBMS Control Channel (MCCH). In an access network, this is referred to as an MCCH information change notification.

In current cellular systems, it is specified that a UE interested in receiving MBMS services has to periodically check the MCCH information change notification. In a WCDMA system, an indicator of MCCH information change notification is sent over an MBMS Indication Channel (MICH). For a Long-Term Evolution (LTE) system (namely, a system in 3GPP Release 9 and thereafter), the indicator of the MCCH information change notification is sent over a Physical Downlink Control Channel (PDCCH).

Further, after receiving the MCCH information change notification, the UE interested in receiving MBMS services acquires new MCCH information immediately from the start of a next modification period, i.e., reads the MCCH to acquire detailed MBMS control information for receiving data. As known to those skilled in the art, the MCCH information uses a configurable repetition period to perform periodic transmissions.

Besides the MCCH information change notification, the current LTE system further defines events that likely trigger the MCCH reading, for example, the UE being powered on or the UE entering into a new cell. In other words, when the two cases occur, the UE needs to immediately read the MCCH. Such design is to prevent the UE from missing any MCCH information change notifications in the two cases.

SUMMARY OF THE INVENTION

The Inventors find that in the case where a Service Area (SA) of an MBMS service of a UE's interest does not cover a Multicast Broadcast Single Frequency Network (MBSFN) area where the UE is located (i.e., it is impossible for the UE to receive the MBMS service of interest), it is a waste in the UE's powers to read the MCCH information change notification and the MCCH for other MBMS services, because the UE is not interested in these MBMS services, but still has to receive various relevant information thereof.

For example, with reference to FIG. 1, it illustrates two cases where the SA of the MBMS service of a UE's interest does not cover the MBSFN area where the UE is located. In these examples, suppose the UE is only interested in an MBMS service A.

In case 1, the SA's coverage area of the MBMS service A is smaller than the area of an MBSFN area 1 where the UE is located, and thus the UE can only receive the detailed MBMS control information and service data of service A within the SA's coverage area of the MBMS service A. It is seen from this figure that the UE is located outside of the SA's coverage area.

In case 2, the SA's coverage area of the MBMS service A is overlapped with an MBSFN area 2, but does not cover the MBSFN area 1 where the UE is located.

Apparently, in either of the above cases, it is impossible for the UE to receive the MBMS service A of its interest, and what is received thereby is unanimously the detailed MBMS control information of other MBMS services which is irrelevant to the MBMS service of its interest. It is a waste of the UE's powers to read the MCCH information change notification and the MCCH for these uninterested MBMS services.

In order to overcome this drawback in the prior art, an aspect of the present invention provides a method for performing MBMS communications, which, for example, may comprise: acquiring location area information of an MBMS service distribution; and notifying a UE of the location area information of the MBMS service distribution.

According to another aspect of the present invention, there is provided a method for receiving an MBMS service, which, for example, may comprise: receiving location area information of an MBMS service distribution; comparing location information of a UE with location area information of the MBMS service distribution; and determining whether to read an MCCH and MCCH information change notification based on a comparing result.

According to a further aspect of the present invention, there is provided an apparatus for performing MBMS communications, which for example comprises MBMS service location acquiring means configured to acquire location area information of an MBMS service distribution; and MBMS service location notifying means configured to notify a UE of the location area information of the MBMS service distribution.

According to a still further embodiment of the present invention, there is provided an apparatus for receiving an MBMS service, which, for example, may comprise: MBMS service location receiving means configured to receive location area information of an MBMS service distribution; location information comparing means configured to compare location information of a UE with location area information of the MBMS service distribution; and determining means configured to determine whether to read an MCCH and MCCH information change notification based on a comparing result.

According to the technical solutions of the present invention, when selecting and receiving an MBMS of interest, the UE may first perform the selection by comparing its location information with the location area information of the MBMS service distribution. Compared with the prior art, this solution helps the UE to save the power for reading the MCCH information change notification and the MCCH.

Specifically, (1) the technical solutions of the present invention support provision of the location area of an MBMS service distribution by the BM-SC at the network side; preferably, this information is transferred via MBMS service description metadata during the service announcement procedure or service discovery procedure, but it is not limited thereto.

(2) By requesting (in the service discovery procedure) or being notified of (in the service announcement procedure) the location area information of MBMS service distribution, any UE may select an MBMS service of its interest based on the comparison between the location area information of the MBMS service distribution and its own location information. For example, if, through comparison, the UE finds that the location area of the MBMS service distribution which is intended to be received thereby does not cover its own location, then the MBMS service might not be selected as the MBMS service of interest (of course, it may also be selected, because it may be received when entering into the location area of the MBMS service in the future. The user of the UE has this option).

(3) The precondition for reading the MBMS information change notification is the comparison between the location area of the MBMS service distribution and the location information of the UE according to embodiments of the present invention. If the location where the UE is located is not covered by the location area of the MBMS service distribution of its interest, it stops reading the MBMS information change notification till the UE is re-powered on or moves to a new cell or finds that the set of MBMS services set of its interest changes or a predetermined time period elapses, and then above comparison process is performed again.

(4) In order to guarantee any newly powered-on or moved-in UE, which may miss any MBMS information change notifications, to access MBMS service data more quickly, the reading of MCCH is also controlled by the location area information of the MBMS service distribution. Specifically, it is prescribed that when entering into the location area of the MBMS service distribution of interest (for example, ascribed to UE being powered on or UE movement), the UE should apply the MCCH information acquiring procedure.

These advantages are only exemplary, and other more advantages of the present invention would be appreciated by those skilled in the art.

BRIEF DESCRIPTION OF THE DRAWINGS

Through reading the following detailed description with reference to the accompanying drawings, the above and other objective, features and advantages of the embodiments of the present invention will become more comprehensible. In the drawings, a plurality of embodiments of the present invention will be illustrated in an exemplary and non-limiting manner, wherein.

DETAILED DESCRIPTION OF THE PREFERRED EMBODIMENTS

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

According to an embodiment of the present invention, there is provided a method and apparatus for performing MBMS service communications and a method and apparatus for receiving an MBMS service.

Besides, the term "acquiring" herein includes currently existing or future developed various kinds of means, for example, PUSH, PULL, etc; and the term "notify" comprises any information delivery implemented according to various kinds of communication protocols in various communication manners (for example, wired, wireless; transmit, transfer; initiative, based on the request, etc.).

Hereinafter, the principle and spirit of the present invention will be described in detail with reference to a plurality of representative embodiments of the present invention.

Figure 1:
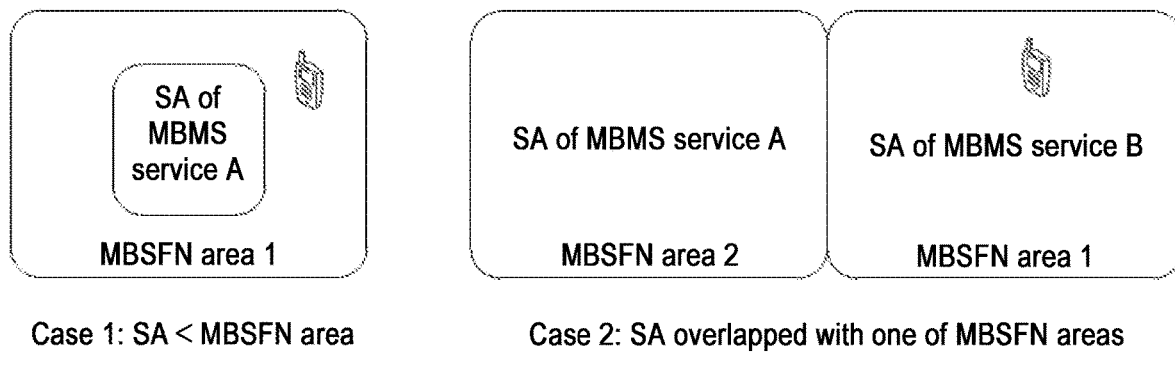
FIG. 1 illustrates two cases where an SA of an MBMS service of the UE's interest does not cover an MBSFN area where the UE is located.
Figure 2:
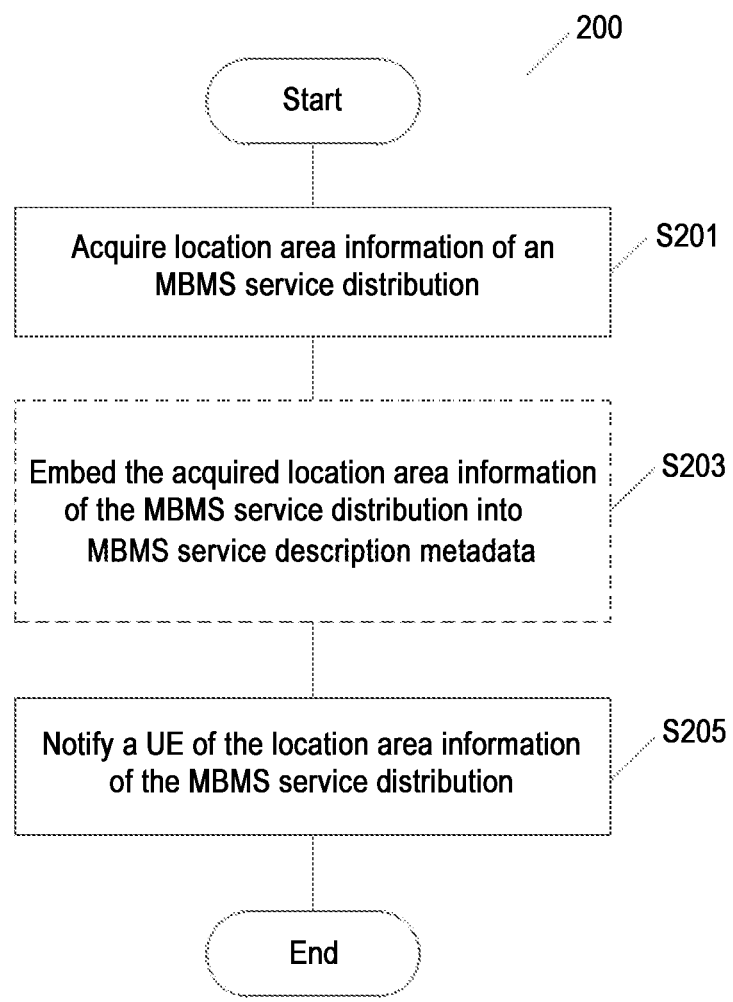
FIG. 2 illustrates a schematic flow chart of a method for performing MBMS service communications according to an embodiment of the present invention.

First, referring to FIG. 2, FIG. 2 illustrates a schematic flow chart of a method 200 for performing MBMS service communications according to an embodiment of the present invention. The method 200, for example, may be implemented by a BM-SC at the network side. Of course, the present invention is not limited thereto, and any proper network side entity may act as the body for implementing the method 200. Hereinafter, the method 200 is only illustrated with the BM-SC as the performing body.

As illustrated in the figure, the method 200, for example, may comprise acquiring location area information of an MBMS service distribution (step S201).

According to some embodiments of the present invention, the location area information of the MBMS service distribution, for example, may comprise SA information of the MBMS service (for example, SA ID list) and mapping relationship information between cells and the SA (i.e., which cells the SA corresponds to). Specifically, such information may be acquired by the BM-SC through configurations by an operator.

According to some other embodiments of the present invention, the location area information of the MBMS service distribution, for example, may comprise mobility management logical area information (for example, Location Area (LA) information, LA ID, of a circuit domain in the WCDMA system, Route Area (RA) information, RA ID, of a packet domain in the WCDMA system, or Tracking Area (TA) information, TA ID, in the LTE system, but not limited thereto). Specifically, the acquiring of mobility management logical area information, for example, may comprise the following procedures: acquiring mappings between cell information and the mobility management logical area information and mappings between the cell information and the SA information; by utilizing the above two mappings, the mobility management logical area information corresponding to the SA information can be acquired. It should be noted that the reason why the mobility management logical area information corresponding to the SA information of the MBMS service can be acquired in this way is that an Operation and Management function (O&M) at the network side configures, per base station, mappings between cells and the mobility management logical area information and mappings between cells and SA information (for example, SA ID). Accordingly, such information may be acquired by the BM-SC from the O&M.

Next, referring to FIG. 2, it is seen from this figure that method 200, for example, may further comprise embedding the acquired location area information of the MBMS service distribution into MBMS service description metadata (step S203).

As known to those skilled in the art, providing an MBMS service comprises a plurality of stages. Here, in a broadcast mode, there are various stages comprising service announcement/discovery, session start, MBMS notification, data transfer and session stop. Besides, subscription (before the service announcement/discovery), joining (between the service announcement/discovery and session start) and leaving (after session stop) are specific to a multicast mode.

Therefore, according to some embodiments of the present invention, preferably, the BM-SC may embed the acquired location area information of the MBMS service distribution into MBSM service description metadata. Here, as known to those skilled in the art, the MBMS service description metadata is provided by the BM-SC to the UE in the service announcement/discovery stage. Because the service announcement procedure and service discovery procedure are known to those skilled in the art, they will not be detailed here.

It should be noted that step S203 is not a must, and thus it is indicated with dotted-line block in FIG. 2. The BM-SC, for example, may construct an individual message to notify the UE of the location information of MBMS service distribution, or carry the location information using other existing messages. These may be selected by those skilled in the art, and the present invention is not limited thereto.

Next, continuing reference to FIG. 2, it is seen from FIG. 2 that method 200, for example, may further comprise notifying the UE of the location area information of the MBMS service distribution (step S205).

Specifically, the BM-SC may notify the UE of the location area information of the MBMS service distribution by utilizing the MBMS service description metadata embedded with the location area information of the MBMS service distribution, any other existing messages or constructed individual messages that can carry this location information.

Figure 3:
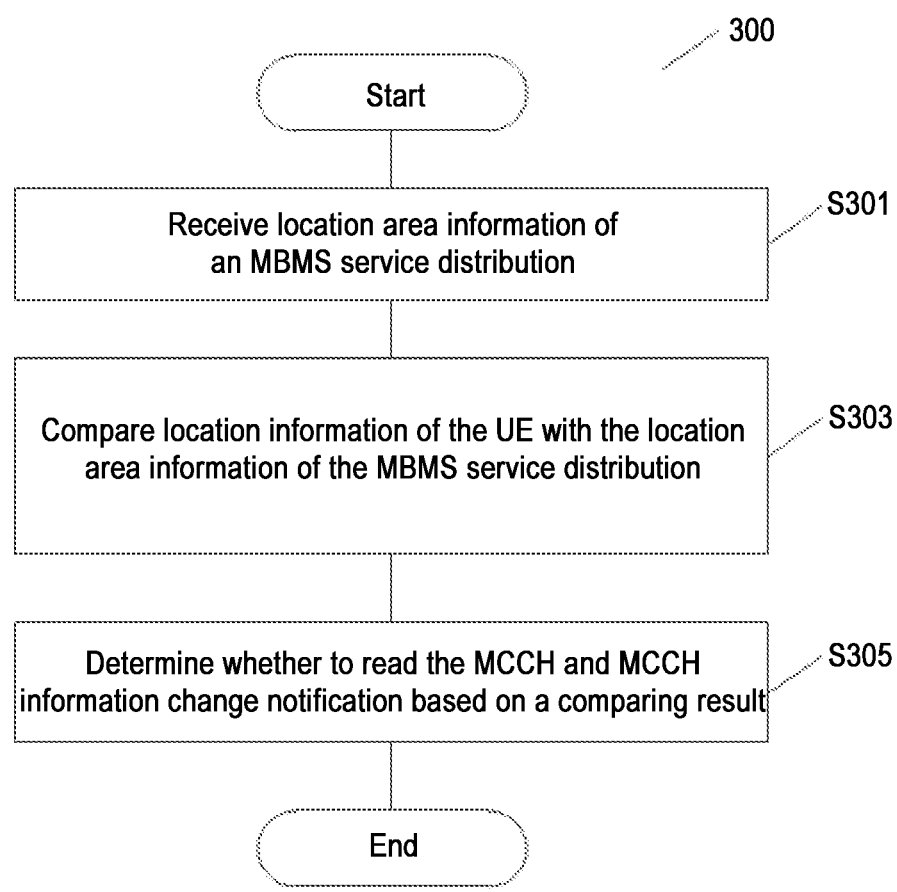
FIG. 3 illustrates a schematic flow chart of a method for receiving an MBMS service according to an embodiment of the present invention.

After introducing the method flow as performed at the network side, FIG. 3 will be referred to hereinafter. Specifically, FIG. 3 illustrates a schematic flow chart of a method 300 for receiving an MBMS service according to an embodiment of the present invention. The method 300, for example, may be performed by a UE. However, the present invention is not limited thereto. Hereinafter, the embodiment of the method 300 is merely illustrated with a UE as the performing body.

As illustrated in FIG. 3, the method 300, for example, may comprise receiving location area information of an MBMS service distribution (step S301).

Specifically, as above mentioned, the UE may receive the location area information of the MBMS service distribution through receiving the MBMS service description metadata embedded with the location area information of the MBMS service distribution, any other existing messages or constructed individual messages that can carry this location information.

Next, the method 300, for example, may further comprise comparing location information of the UE with the location area information of the MBMS service distribution (step S303).

According to the embodiments of the present invention, the location information of UE is the information of a cell where the UE is located or the information of MBSFN areas where the UE is located.

As known to those skilled in the art, a base station may send an MBMS service within an SA area of the MBMS service as notified by the network side, or may determine to send it within all MBSFN areas that comprise the SA and correspond to the SA area, which may be determined by the base station.

According to the embodiments of the present invention, an entity at the network side (including, but not limited to, a base station) may send, to the UE, MBMS service transmission area information, i.e., information about the actual transmission area of the MBMS service, which may be SA location information of the MBMS service or information of all MBMSFN areas that comprise the SA and correspond to the SA.

According to the embodiments of the present invention, for example, a 3GPP protocol may also prescribe the MBMS service transmission area information, and therefore the UE may acquire the MBMS service transmission area information based on the specification of the protocol.

Therefore, if the MBMS service transmission information acquired by the UE (based on either of the above two manners) indicates to the UE that the MBMS service is transmitted within the SA area, then the location information of the UE is the information of the cell where the UE is located.

If MBMS service transmission area information as acquired by the UE indicates to the UE that the MBMS service is transmitted within all MBSFN areas that comprise the SA and correspond to the SA, then the location information of the UE is the information of the MBSFN area where the UE is located.

Specifically, if the location information of the UE is the information of the cell where the UE is located, then the above comparing step, for example, may comprise comparing the cell location where the UE is located with the cell location as indicated by the SA information or mobility management logical area information of the MBMS service (for example, the Location Area information, LA ID, of the circuit domain in the WCDMA system, the Route Area information, RA ID, of the packet domain in the WCDMA system, or the Tracking Area information, TA ID, in the LTE system, but not limited thereto).

Those skilled in the art would appreciate that, in the case that UE has received, from the BM-SC, the SA information of the MBMS service and the mapping relationship between cells and the SA, it may determine which cells are covered by the SA based on the above information. If the UE has received from the BM-SC the mobility management logical area information of the MBMS service, then the UE may also determine which cells are covered by the mobility management logical area based on its known mappings between the mobility management logical area and cells.

Alternatively, if the location information of the UE is the information of the MBSFN area where the UE is located, then the above comparing step, for example, may comprise comparing cells covered by the MBSFN area where the UE is located with the cell location as indicated by the SA information or mobility management logical area information of the MBMS service.

Next, continuing reference to FIG. 3, it is seen that the method 300, for example, may further comprise determining whether to read an MCCH and MCCH information change notification based on a comparing result (step S305).

Specifically, if the comparing result indicates that the location area of the MBMS service distribution covers the location of the UE (for example, a cell or an MBSFN area), then the MCCH and MCCH channel change notification are read; otherwise, the reading of MCCH and MCCH channel change notification are stopped.

It should be noted that, for example, the above comparing step may be performed when the following events occur: after the UE is powered on or moves into a new cell, a set of MBMS services of the UE's interest is not empty (otherwise, the UE has to monitor all MCCHs to select MBMS services of its interest); or the set of MBMS services of the UE's interest changes (for example, the user of the UE newly selects or deletes an MBMS service of its interest which has been selected); or a predetermined time period elapses (i.e., occurring periodically).

According to some embodiments of the present invention, preferably, if the location where the UE is located is not covered by the location area of the MBMS service distribution of its interest, it stops reading the MBMS information change notification till the UE is re-powered on, moves to a new cell or finds that the set of MBMS services of its interest changes or a predetermined time period elapses, and then the above comparison process is performed again.

According to some further embodiments of the present invention, preferably, in order to guarantee any newly powered-on or moved-in UE, which may miss any MBMS information change notifications, to access MBMS service data more quickly, the reading of MCCH is also controlled by the location area information of the MBMS service distribution. Specifically, it may be prescribed that when entering into the location area of the MBMS service distribution of its interest (for example, ascribed to UE being powered on or UE movement), the UE should apply the MCCH information acquiring procedure.

Of course, those skilled in the art would fully appreciate that the triggering events of the above comparing step are only exemplary, not for limiting the present invention, and any event related to MBMS services may be used to trigger the comparing step. For example, when the UE selects an MBMS service of its interest, it may first perform the comparing step, and then determine whether to select the MBMS service as the MBMS service of interest based on the comparing result.

Hereinafter, an MBMS service communication apparatus will be described with reference to FIG. 4, where it illustrates a schematic block diagram of an MBMS service communication apparatus 400 according to an embodiment of the present invention.

Figure 4:
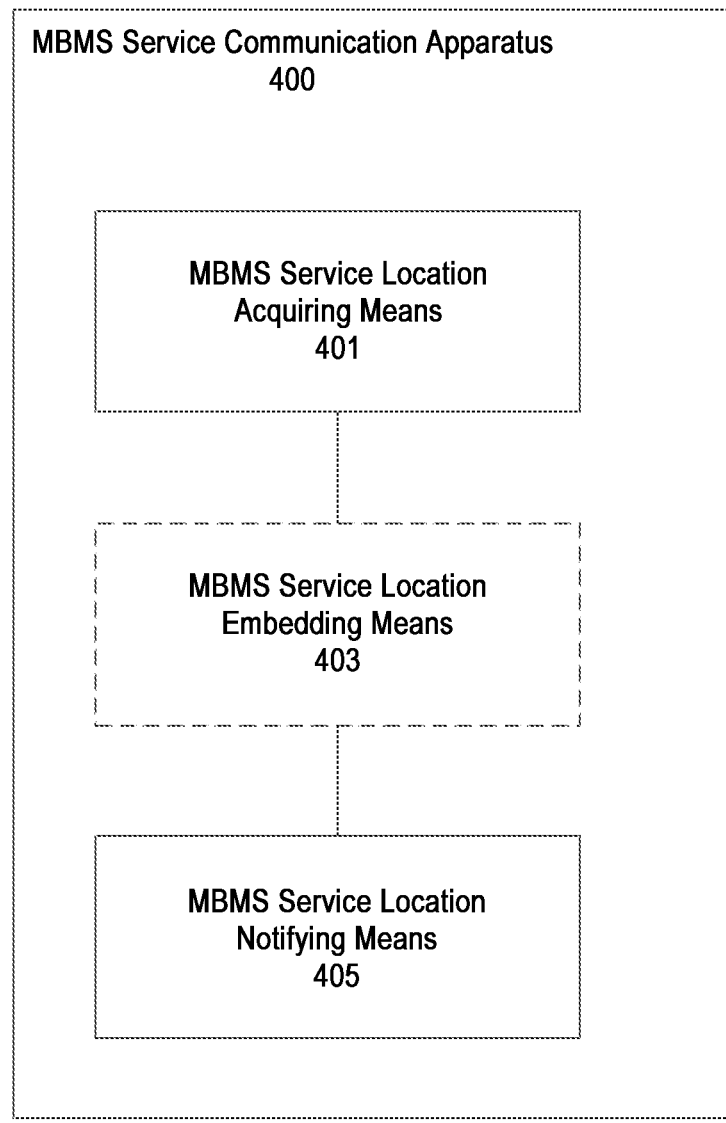
FIG. 4 illustrates a schematic block diagram of an apparatus for performing MBMS service communications according to an embodiment of the present invention.

As illustrated in FIG. 4, the MBMS service communication apparatus 400, for example, may comprise: MBMS service location acquiring means 401 configured to acquire location area information of an MBMS service distribution; and MBMS service location notifying means 405 configured to notify a UE of the location area information of the MBMS service distribution.

According to embodiments of the present invention, the location area information of the MBMS service distribution, for example, may comprise SA information and mapping relationship information between cells and the SA.

According to other embodiments of the present invention, the location area information of the MBMS service distribution, for example, may comprise mobility management logic area information (for example, Location Area (LA) information, LA ID, of a circuit domain in the WCDMA system, the Route Area (RA) information, RA ID, of a packet domain in the WCDMA system, or the Tracking Area (TA) information, TA ID, in the LTE system, but not limited thereto).

According to the embodiments of the present invention, as illustrated in FIG. 4, the MBMS service communication apparatus 400, for example, may alternatively (illustrated by dotted-line block) further comprise MBMS service location embedding means 403 configured to embed the acquired location area information of the MBMS service distribution into MBMS service description metadata.

According to some embodiments of the present invention, the MBMS service location notification means 405, for example, may comprise means for, during the service notification or service discovery process, notifying the UE of the location area information of the MBMS service distribution by utilizing the MBMS service description metadata.

Next, an MBMS service receiving apparatus will be described with reference to FIG. 5, where it illustrates a schematic block diagram of the MBMS service receiving apparatus 500 according to an embodiment of the present invention.

Figure 5:
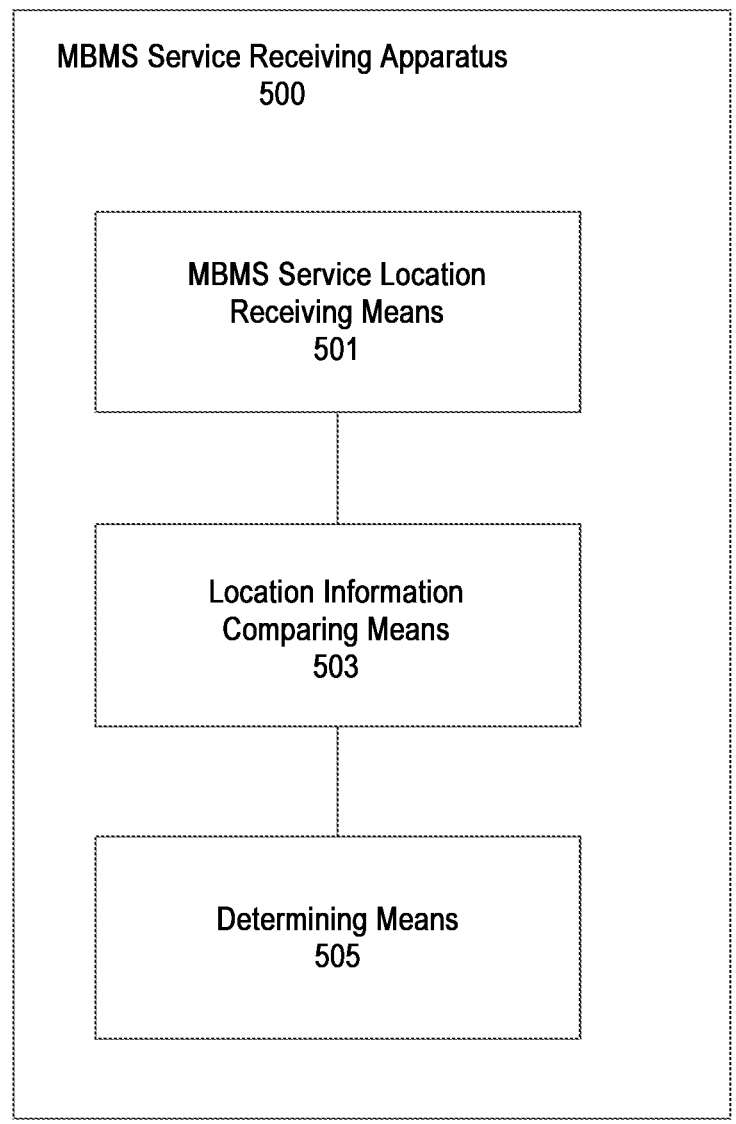
FIG. 5 illustrates a schematic block diagram of an apparatus for receiving an MBMS service according to an embodiment of the present invention.

As illustrated in FIG. 5, the MBMS service receiving apparatus 500, for example, may comprise: MBMS service location receiving means 501 configured to receive location area information of an MBMS service distribution; location information comparing means 503 configured to compare location information of UE with the location area information of the MBMS service distribution; and determining means 505 configured to determine whether to read an MCCH and MCCH information change notification based on a comparing result.

According to some embodiments of the present invention, the location information of UE is the information of the cell where the UE is located or the information of the MBSFN area where the UE is located.

Specifically, if MBMS service transmission area information as acquired by UE indicates to the UE that the MBMS service is transmitted within the SA area, then the location information of the UE is the information of the cell where the UE is located.

If the MBMS service transmission area information acquired by the UE indicates to the UE that the MBMS service is transmitted within all MBSFN areas that comprise the SA and correspond to the SA, then the location information of the UE is the information of the MBSFN area where the UE is located.

According to the embodiments of the present invention, the location information comparing means 505 operates in response to the following events: after the UE is powered on or moves into a new cell, the set of MBMS services of the UE's interest is not empty; or the set of MBMS services of the UE's interest changes; or a predetermined time period elapses.

It should be noted that various operations of the means that are not described in detail are identical to the method steps. For the sake of brevity, they will not be detailed here.

Figure 6:
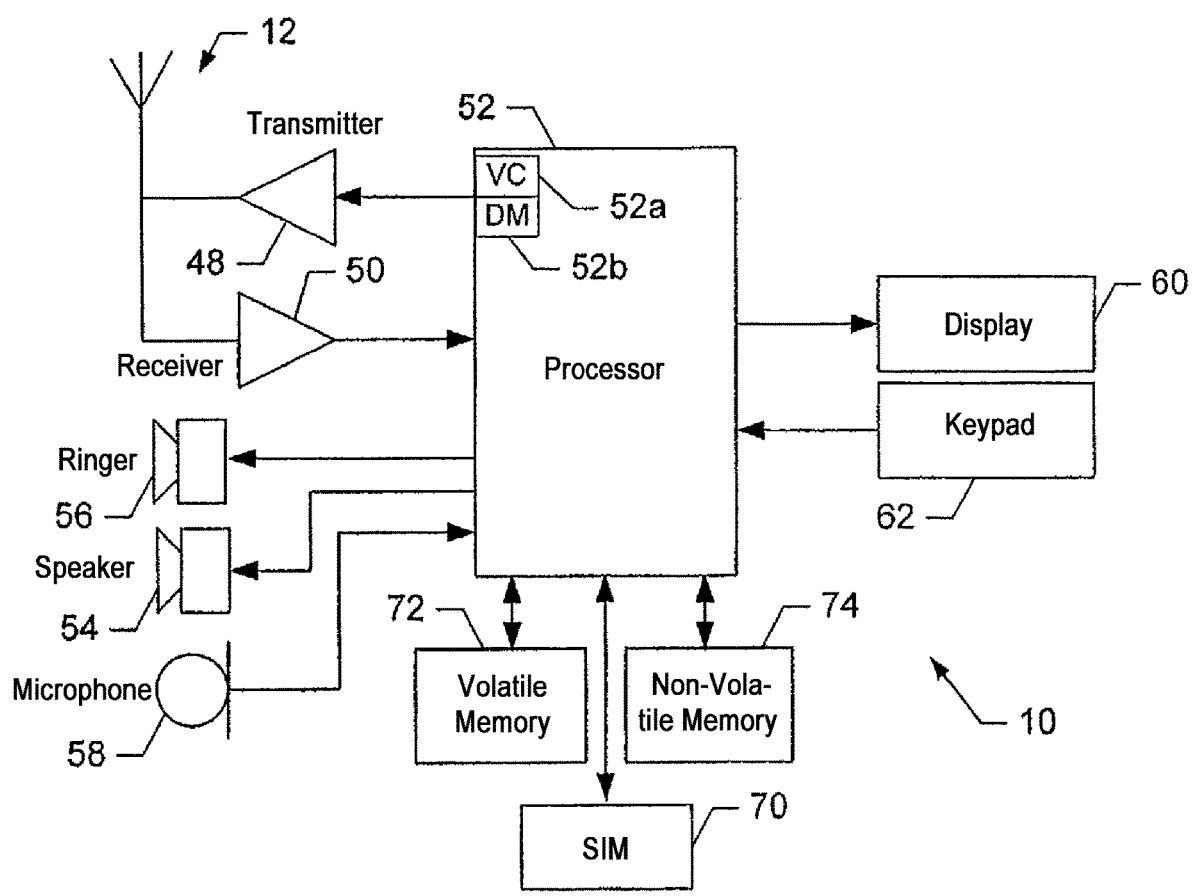
FIG. 6 illustrates a diagram of a type of apparatuses that would benefit from the embodiments of the present invention.

Next, referring to FIG. 6, it illustrates a diagram of a type of apparatuses that would benefit from the embodiments of the present invention, for example, a mobile station 10, and more specifically, for example, a mobile phone. However, it should be noted that the illustrated and to-be-described mobile station hereinafter merely illustrates a type of mobile stations that would benefit from the present invention, which thus should not be interpreted as limiting the scope of the present invention. Although a plurality of embodiments of the mobile station will be described hereinafter for the exemplary purposes, other apparatuses such as a portable digital assistant (PDA), a pager, a laptop, and other kind of electronic system may also easily apply the embodiments of the present invention.

The mobile station 10 comprises various means that perform one or more functions according to the exemplary embodiments of the present invention, including those means that are illustrated and described here. However, it should be understood that without departing from the spirit and scope of the present invention, the mobile station may comprise alternative means for performing one or more similar functions. More specifically, for example, as illustrated in FIG. 6, besides an antenna 12, the mobile station further comprises a transmitter 48, a receiver 50, and a processor 52, where the processor 52 provides signals to the transmitter and receiver, respectively, and receives signals from the transmitter and receiver. These signals comprise signaling information according to applicable air interface standards for the cellular system, and also comprise user voice or data generated by the user. In this regard, the mobile station may operate by utilizing one or more air interface standards, communication protocols, modulation types, and access types. More specifically, the mobile station may operate according to any protocol among various first generation (1G), second generation (2G), 2.5G, and/or third generation (3G) communication protocols. For example, the mobile station may operate based on the 2G wireless communication protocols IS-136 (TDMA), GSM, and IS-95 (CDMA). For another example, the mobile station may operate based on the 2.5G wireless communication protocols GPRS, EDGE, etc. For another example, the mobile station may operate according to the 3G wireless communication protocols, for example, applying the UMTS network in the WCDMA wireless access technology. Just like a dual-mode or higher-mode phone (for example, digital/analog or TDMA/CDMA/analog phones), some NAMPS and TACS mobile stations may also benefit from the teaching of the present invention.

It should be understood that the processor 52 comprises a circuit required for implementing audio and logical functions of the mobile station 10. For example, the processor may comprise a digital signal processor device, a microprocessor device, various kinds of A/D converters, D/A converters, and other support circuits. The control and signal processing functions of the mobile station are distributed between these devices according to their corresponding capacities. The processor may additionally comprises an internal voice editor (VC) 52a and may comprise an internal data modem (DM) 52b. Further, the processor may comprise a function capable of operating one or more software programs stored in the memory (which will be described hereinafter).

The mobile station 10 also comprises a user interface that comprises a conventional earphone or speaker 54, ringer 56, microphone 58, display 60, and a user input interface, all of which are coupled to the processor 52. Although not shown, the mobile station may comprise a battery for supplying power to various circuits required by operating the mobile station and alternatively provides mechanical vibration as detectable outputs. A user input interface allowing the mobile station to receive data may comprise any device in a plurality of devices that allow the mobile station to receive data, for example, a keypad 62, a touch display (not shown), a joystick (not shown) and other input devices. In the exemplary embodiments comprising a keypad, the keypad comprises conventional digit (0-9) and other relevant keys (#, *), and other keys for operating the mobile station.

The mobile station 10 may further comprises a memory, for example, a memory such as a Subscriber Identification Module (SIM) 70, Removable User Identification Module (R-UIM) and the like, which memory generally stores information elements associated with the mobile user. Besides the SIM, the mobile station may comprise other removable and/or fixed memory. In this regard, the mobile station may comprise a volatile memory 72, for example, a volatile Random Access Memory (RAM), which comprises a cache area for temporarily storing data. The mobile station may further comprise other non-volatile memory 74 which may be embedded and/or removable. The non-volatile memory may additionally or alternatively include for example, EEPROM and flash memory, etc. The memory may store any plurality of software applications, instructions, a plurality of pieces of information and data that may be used by the mobile station to implement the mobile station's functions. According to the embodiments of the present invention, for example, a memory of a non-volatile memory 74 of mobile station 10 may store software and other data and/or settings required for implementing one or more features. At this point, each feature generally relates to the corresponding function that is executable when the mobile station is executing software and/or using data and other settings. However, as used here, the term "feature" not only indicates relevant functions, but also indicates the bottom layer software and other data and/or settings stored in the memory. Although it is not essential for implementing the present invention, before delivering the mobile station to the terminal user, various features may be stored in the memory. For example, during the manufacturing period or before being delivered to the terminal user, a certain other point of the mobile station is distributed. Before initiating the corresponding feature as described below, various data stored in the memory are disabled and thus cannot be operated by the mobile station. The status of each feature may be defined in various manners, for example, a flag associated with a corresponding feature is utilized to indicate whether the feature has been initiated or maintained being disabled.

Embodiments of the present invention can be implemented with software, hardware or the combination thereof. The hardware part can be implemented by a special logic; the software part can be stored in a memory and executed by a proper instruction execution system such as a microprocessor or a dedicated designed hardware. Those normally skilled in the art may understand that the above apparatus and method may be implemented with computer-executable instructions and/or in processor-controlled codes, for example, such code is provided on a carrier medium such as a magnetic disk, CD, or DVD-ROM, or a programmable memory such as a read-only memory (firmware) or a data carrier such as an optical or electronic signal carrier. The apparatuses and their components in the present invention may be implemented by a hardware circuitry such as a very large scale integrated circuit or gate array, a semiconductor such as a logical chip or transistor, or a programmable hardware device such as a field-programmable gate array, a programmable logical device or the like, or implemented by software executed by various kinds of processors, or implemented by the combination of the above hardware circuitry and software.

It should be noted that although several means or sub-means of the MBMS service communication apparatus and MBMS service receiving apparatus have been mentioned in the above detailed depiction, such division is merely non-compulsory. In actuality, according to the embodiments of the present invention, the features and functions of the above described two or more means may be embodied in one means. In turn, the features and functions of the above described one means may be further embodied in more means.

Besides, although operations of the present invention method are described in a particular order in the drawings, it does not require or imply that these operations must be performed according to this particular order, or a desired outcome can only be achieved by performing all shown operations. On the contrary, the execution sequences for the steps as depicted in the flowcharts may change. Additionally or alternatively, some steps may be omitted, a plurality of steps may be merged into one step, or one step may be divided into a plurality of steps for execution.

Although the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method for performing Multimedia Broadcast Multicast Service (MBMS) communications, comprising:
    acquiring location area information for an MBMS service at a network entity in a network side of a cellular system, wherein the location area information includes a service area identifier for the MBMS service; and
    notifying a User Equipment (UE) of the location area information for the MBMS service, wherein the notifying includes providing the location area information from the network entity to the UE via a base station, wherein the service area identifier for the MBMS service corresponds to a coverage area for the MBMS service within the cellular system.

2. The method of claim 1, wherein the location area information for the MBMS service comprises coverage area information and relationship information mapping between cells and the coverage area.

3. A method for receiving a Multimedia Broadcast Multicast Service (MBMS) communication, comprising:
    receiving location area information for an MBMS service at a User Equipment (UE) from a network entity via a base station, wherein the network entity and base station are in a network side of a cellular system, wherein the location area information includes a service area identifier for the MBMS service;
    comparing location information of the UE with the location area information for the MBMS service when the UE is interested in receiving the MBMS service associated with the location area information, wherein the service area identifier for the MBMS service corresponds to a coverage area for the MBMS service within the cellular system; and
    reading an MBMS Control Channel (MCCH) and an MCCH information change notification where the comparing indicates the UE is in the coverage area for the MBMS service.

4. The method of claim 3, wherein the location information of the UE identifies a cell in which the UE is located or identifies a specific MBSFN area in which the UE is located.

5. The method of claim 4, wherein, where the location area information indicates the coverage area for the MBMS service is smaller than an MBSFN area in which the UE is located, the location information of the UE identifies the cell in which the UE is located.

6. The method of claim 3, wherein the comparing is triggered by at least one of the following events:
    powering on the UE;
    entering a new cell with the UE;
    changing a set of MBMS services in which the UE is interested; and
    expiration of a predetermined time period in relation to previous comparing.

7. A network entity in a network side of a cellular system for facilitating Multimedia Broadcast Multicast Service (MBMS) communications, the network entity comprising:
    at least one processor and associated memory;
    wherein the at least one processor is configured to acquire location area information for an MBMS service, wherein the location area information includes a service area identifier for the MBMS service;
    wherein the at least one processor is configured to notify a User Equipment (UE) of the location area information for the MBMS service, wherein the notifying includes providing the location area information to the UE via a base station, wherein the service area identifier for the MBMS service corresponds to a coverage area for the MBMS service within the cellular system.

8. The network entity of claim 7, wherein the location area information for the MBMS service comprises coverage area information and relationship information mapping between cells and the coverage area.

9. A User Equipment (UE) for receiving a Multimedia Broadcast Multicast Service (MBMS) communication, the UE comprising:
    at least one processor and associated memory; and
    a receiver configured to receive location area information for an MBMS service from a network entity via a base station, wherein the network entity and the base station are in a network side of a cellular system, wherein the location area information includes a service area identifier for the MBMS service;
    wherein the at least one processor is configured to compare location information of the UE with the location area information for the MBMS service when the UE is interested in receiving the MBMS service associated with the location area information, wherein the service area identifier for the MBMS service corresponds to a coverage area for the MBMS service within the cellular system;
    wherein the at least one processor is configured to read an MBMS Control Channel (MCCH) and an MCCH information change notification where the comparing indicates the UE is in the coverage area for the MBMS service.

10. The UE of claim 9, wherein the location information of the UE identifies a cell in which the UE is located or identifies a specific MBSFN area in which the UE is located.

11. The UE of claim 10, wherein, where the location area information indicates the coverage area for the MBMS service is not smaller than an MBSFN area in which the UE is located, the location information of the UE identifies the MBSFN area in which the UE is located.

12. The UE of claim 9, wherein the at least one processor is configured to perform the comparing in response to at least one of the following events:
    powering on the UE;
    entering a new cell with the UE;
    changing a set of MBMS services in which the UE is interested; and
    expiration of a predetermined time period in relation to previous comparing.

13. The method of claim 1, wherein the location area information for the MBMS service comprises mobility management logical area information.

14. The method of claim 3, further comprising:
not reading the MCCH and the MCCH information change notification where the comparing indicates the UE is not in the coverage area for the MBMS service.

15. The network entity of claim 7, wherein the location area information for the MBMS service comprises mobility management logical area information.

16. The UE of claim 9, wherein the at least one processor is configured to not read the MCCH and the MCCH information change notification where the comparing indicates the UE is not in the coverage area for the MBMS service.

17. The method of claim 4, wherein, where the location area information indicates the coverage area for the MBMS service is not smaller than the first MBSFN area in which the UE is located, the location information of the UE identifies the MBSFN area in which the UE is located.

18. The UE of claim 10, wherein, where the location area information indicates the coverage area for the MBMS service is smaller than an MBSFN area in which the UE is located, the location information of the UE identifies the cell in which the UE is located.

19. The method of claim 1, wherein the UE is configured to compare location information of the UE with the location area information for the MBMS service when the UE is interested in receiving the MBMS service associated with the location area information;
wherein the UE is configured to read an MBMS Control Channel (MCCH) and an MCCH information change notification where the comparing indicates the UE is in the coverage area for the MBMS service;
wherein the UE is configured to not read the MCCH and the MCCH information change notification where the comparing indicates the UE is not in the coverage area for the MBMS service.

20. The network entity of claim 7, wherein the UE is configured to compare location information of the UE with the location area information for the MBMS service when the UE is interested in receiving the MBMS service associated with the location area information;
wherein the UE is configured to read an MBMS Control Channel (MCCH) and an MCCH information change notification where the comparing indicates the UE is in the coverage area for the MBMS service;
wherein the UE is configured to not read the MCCH and the MCCH information change notification where the comparing indicates the UE is not in the coverage area for the MBMS service.

21. The method of claim 1, further comprising:
embedding the acquired location area information for the MBMS service into MBMS service description metadata at the network entity; and
utilizing the MBMS service description metadata during a service announcement or service discovery process to notify the UE of the location area information for the MBMS service.

22. The network entity of claim 7, wherein the at least one processor is configured to embed the acquired location area information for the MBMS service into MBMS service description metadata;
wherein the at least one processor is configured to utilize the MBMS service description metadata during a service announcement or service discovery process to notify the UE of the location area information for the MBMS service.

* * * * *